May 5, 1964
J. R. RICHTER
3,131,507
MOTOR NOISE ATTACHMENT FOR BICYCLE
Filed Sept. 29, 1961
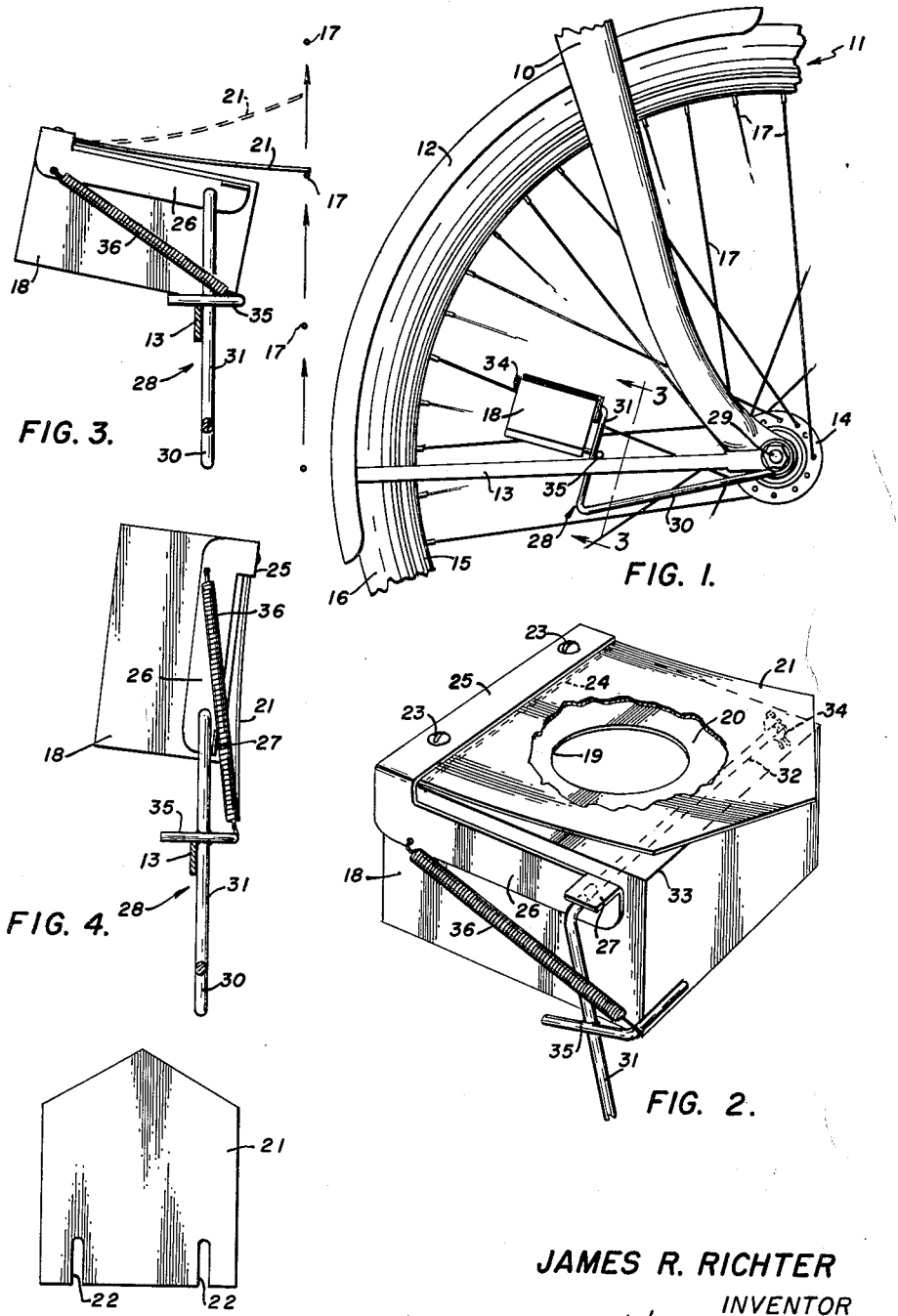
JAMES R. RICHTER
INVENTOR
BY *Herbert J. Brown*
ATTORNEY

United States Patent Office 3,131,507
Patented May 5, 1964

3,131,507
MOTOR NOISE ATTACHMENT FOR BICYCLE
James R. Richter, 2808 Sadler, Fort Worth, Tex.
Filed Sept. 29, 1961, Ser. No. 141,902
1 Claim. (Cl. 46—175)

This invention relates to noise makers for attachment to vehicles having spoke wheels, particularly bicycles, and has reference to a device for simulating the sound of a motor, for example, a motorcycle motor. Such realistic sound enhances the pleasure of children when riding bicycles and tricycles by stimulating their imaginations and by the attention such noise makers attract.

Although noise makers of the general class referred to have been made and used heretofore, they have not been entirely satisfactory for one reason or another. A primary objection was that they did not realistically simulate the sound of a speeding internal combustion engine. Another objection was that they had a tendency to loosen the spokes of the wheel with which they made contact.

An object of the invention is to provide a device for attachment to motorless vehicles having spoke wheels for coaction therewith, and which device more nearly simulates the sound of an internal combustion engine than devices of the same general class heretofore made and used.

Another object of the invention is to provide a motor simulating device for vehicles with spoke wheels and coaction therewith, and which device has less tendency to loosen the spokes with which it makes contact.

A particular object of the invention is to provide a noise maker for coaction with the spokes of a wheel when the latter is turning in a forward direction, yet one which will tilt and relieve undue pressure on the spokes when the wheel is turned in a reverse direction.

A further object of the invention is to provide a bracket for mounting on a bicycle which will automatically position the noise making device at an optimum angle for coaction with adjacent spokes which are angularly disposed relative to each other.

A still further object is to provide a noise maker of the described class having an elongate vibrator for contact with the spokes of a wheel and which vibrator is longitudinally adjustable for adaptation to various sizes of wheels.

Another object is to provide a noise maker for contact with the spokes of a wheel and wherein the sound box and vibrator are rotatably mounted for "on" and "off" positions, together with a spring loaded toggle arrangement for maintaining the device in its selected position.

These and other objects will become apparent from the following description and accompanying drawing, wherein:

FIGURE 1 is a broken side elevational view of the forward portion of a bicycle showing the present invention installed thereon.

FIGURE 2 is an enlarged broken perspective view of the sound box and vibrator of the invention.

FIGURE 3 is an enlarged sectional and elevational view taken on line 3—3 of FIGURE 1 and showing the device in its "on" or operating position.

FIGURE 4 is a view similar to FIGURE 3 but showing the device in its "off" position, and FIGURE 5 is a plan view of the vibrator of the invention.

The fragmentary portion of a bicycle shown in FIGURE 1 includes a fork 10, a wheel 11, fender 12 and fender braces 13, all in the usual manner. The wheel 11, which is conventional, is comprised of a hub 14, rim 15, tire 16 therearound, and wire spokes 17 connecting the hub with the rim.

The illustrated form of the invention includes a closed rectilinear sound box 18 having a single centrally located circular opening 19 in its largest surface 20. The size of the opening 19 is determined by empirical test. The surface 20 is covered by a normally flat vibrator 21 which is made of relatively stiff sheet material such as phenolic impregnated fabric. The sides of the vibrator 21 are parallel, the base end is square and the remaining or extending end is pointed. The base end has slots 22 parallel with the sides and inwardly of the adjacent corners for receiving screws 23 which adjustably hold the vibrator 21 in place. The screws 23 extend through the sound box surface 20 near the edge thereof and the base end of the vibrator 21 is clamped between inner and outer flat bars 24 and 25. The inner bar 24 is adjacent the inner surface of the box surface 20 and threadedly receives the screws 23, and the outer bar 25 is positioned against the outer surface of the vibrator 21. One end of outer bar 25 has an integral right angle extension 26 which is bent to coincide with an end surface of the sound box 18 and provides a support for an outwardly extending projection 27.

A mounting bracket, generally designated by the numeral 28, is preferably made of a rod having an eye (not shown) formed in one end thereof. The eye is flattened and is mounted on the wheel axle 29 outwardly of the bicycle fork 10. The primary length 30 of the mounting bracket 28 extends rearwardly of the axle 29 and beneath one of the fender braces 13, then turns upwardly, as at 31, and thence rearwardly at a right angle to provide a mounting shaft 32 which extends through the extension 26 and the sound box 18 near and parallel with a corner 33 edge thereof. For the purpose of identification the last referred to corner 33 will hereinafter be referred to as the "pivoted" corner of the sound box 18. The end of the mounting shaft 32 extending beyond the box 18 is provided with suitable retaining means such as the cotter key and washer 34 shown by dotted lines in FIGURE 2.

An angular stop 35 is transversely mounted on the upwardly extending portion 31 of the mounting bracket 28, one leg of which stop is positioned to rest on the adjacent fender brace 13 and the other leg is positioned to engage a side of the box 18 when the latter is pivoted outwardly to its "on" position, that is, positioned so that the extending end of the vibrator 21 will be contacted by the spokes 17 of the turning wheel. It will be noted in FIGURE 3 that the angle between the vibrator 21 at time of contact and the path of the spokes 17 is greater than 90°. A coiled tension spring 36 is connected between the apex of the angular stop 35 and the clamp extension 26 at the end thereof remote from the projection 27.

In operation the sound box 18 is tilted about its pivoted corner 33 in a direction so that the vibrator 21 is substantially perpendicular to the path of the spokes 17. The spokes striking the vibrator 21 and the resulting rapid contact with the surface 20 produces a sound similar to that of a relatively small internal combustion engine. It is to be noted that the plane of the vibrator 21 coincides with the median line between adjacent spokes 17 on one side of the wheel 11 when the vibrator is midway therebetween; thus, since these spokes are not parallel with each other, contact is made first with one side of the pointed end of the vibrator 21 and then with the other.

In the event the wheel 11 is rotated rearwardly, then one or more spokes 17 strike the outer surface of the vibrator and causes the box 18 to tilt to relieve undue pressure on the spokes and vibrator. The spring 36 holds the vibrator and sound box in "off" position. The box 18 may be selectively retained in the "off" position by lifting the spring 36 over the projection 27.

The invention is not limited to the exemplary construction herein shown and described, but may be made in various ways within the scope of the appended claim.

What is claimed is:

A noise making device for a vehicle having at least one spoke wheel, said device comprising: a sound box including a flat surface having an opening therein spaced from the periphery thereof, a vibrator of flat spring material secured at its base end to one side of said flat surface and extending over said hole and beyond the opposite side of said box and positioned for contact with said spokes, a support carried by said vehicle pivotally mounting said sound box on an axis transverse to the extending length of said vibrator and substantially parallel with the spokes when positioned to be contacted by said vibrator stop means limiting rotation of said sound box in an arc positioning the length of said vibrator perpendicular to the direction of rotation of said spokes, a tension spring connected at one end with the side of said sound box opposite said support, and means connecting the remaining end of said tension spring with a stationary point on the side of but spaced from said support.

References Cited in the file of this patent

UNITED STATES PATENTS

| | | |
|---|---|---|
| 2,633,097 | Frew | Mar. 31, 1953 |
| 2,667,720 | Connell | Feb. 2, 1954 |
| 2,987,850 | Bergland | June 13, 1961 |